Figure 1:
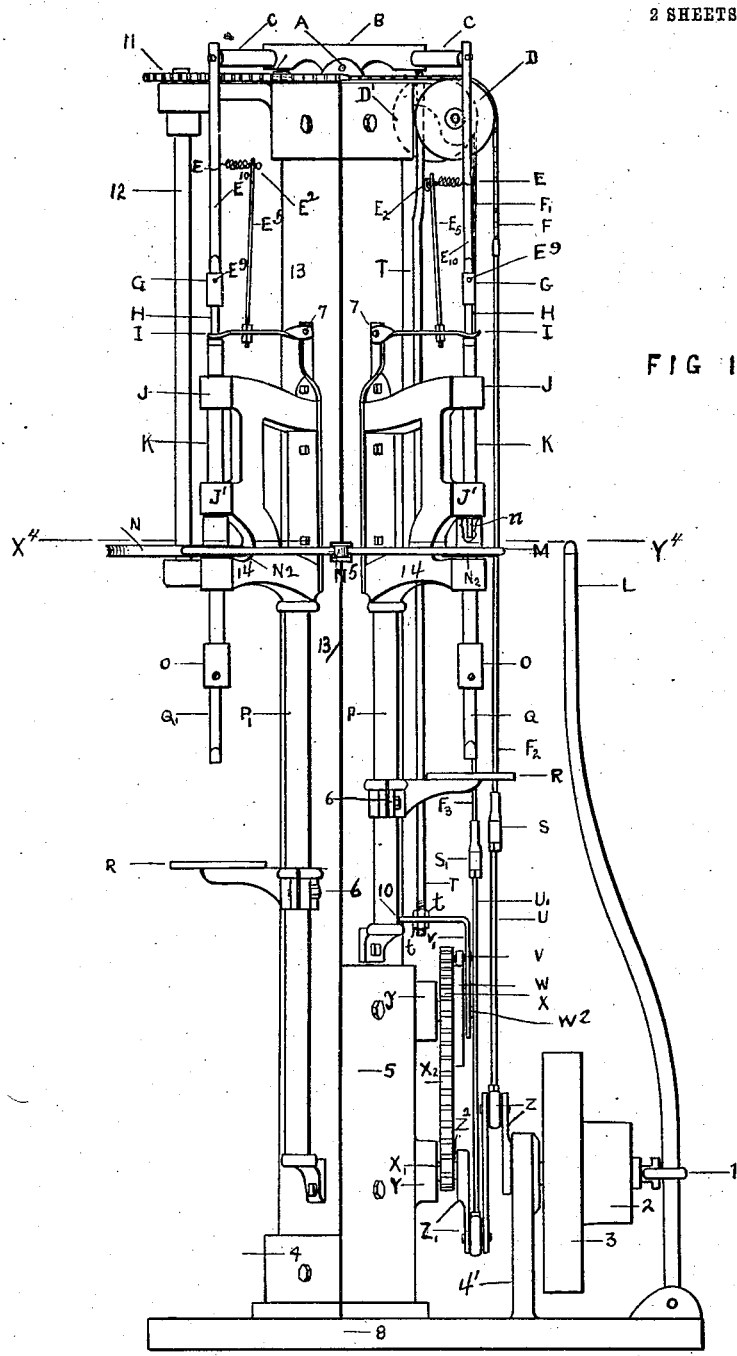

O. A. OLSON.
VALVE SEATING AND SURFACE LAPPING MACHINE.
APPLICATION FILED APR. 11, 1911.

1,024,806.

Patented Apr. 30, 1912.

2 SHEETS—SHEET 1.

WITNESSES
Harry E. Schank
Joseph Roberts.

INVENTOR
Oscar A. Olson
BY H. C. Gardiner,
ATTORNEY.

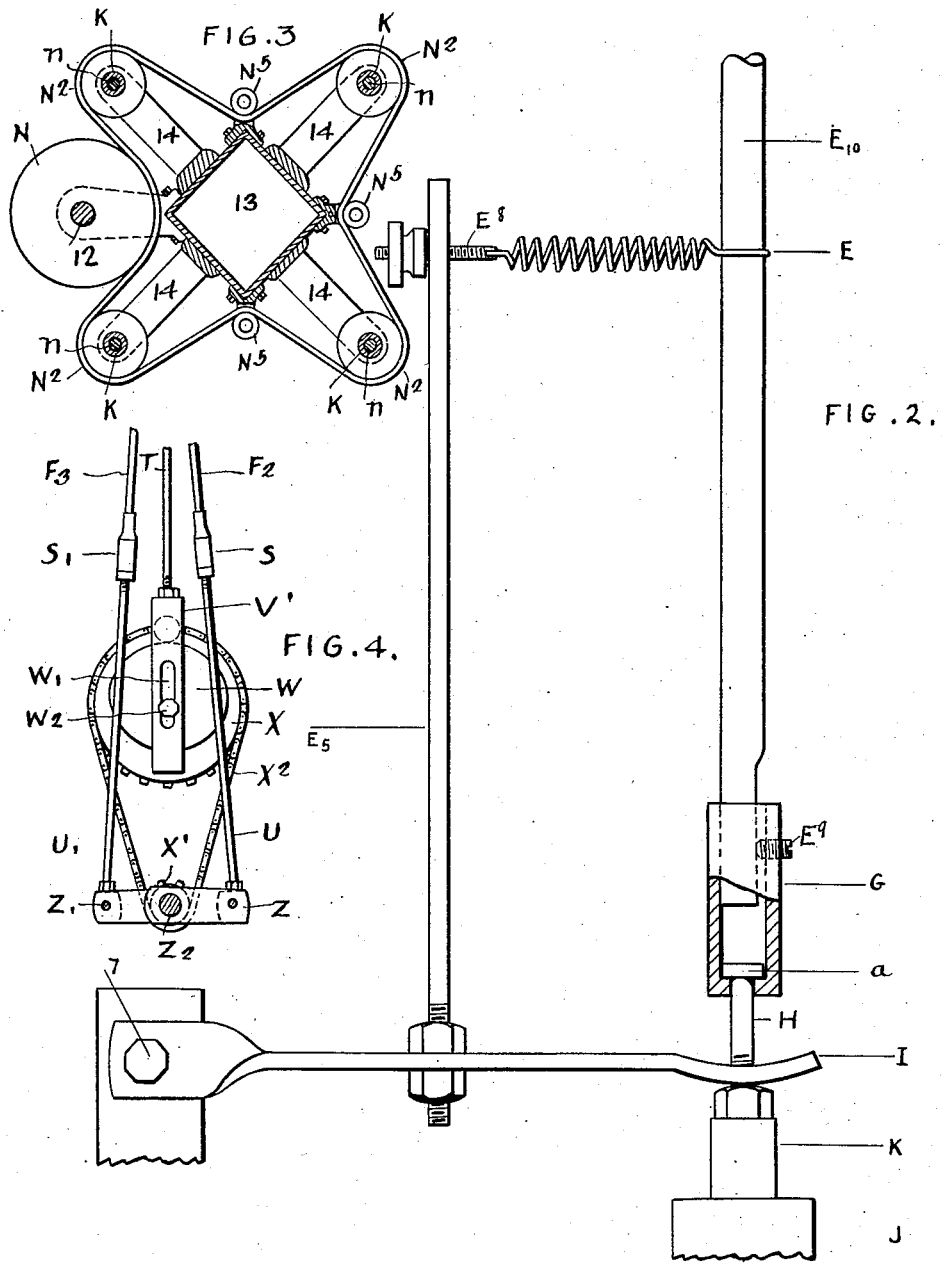

UNITED STATES PATENT OFFICE.

OSCAR A. OLSON, OF LINCOLN, NEBRASKA.

VALVE-SEATING AND SURFACE-LAPPING MACHINE.

1,024,806.  Specification of Letters Patent.  Patented Apr. 30, 1912.

Application filed April 11, 1911. Serial No. 620,487.

*To all whom it may concern:*

Be it known that I, OSCAR A. OLSON, a citizen of the United States, residing at Lincoln, in the county of Lancaster and State of Nebraska, have invented new and useful Improvements in Valve-Seating and Surface-Lapping Machines, of which the following is a specification.

My invention relates to mechanism for grinding or seating valves and has for its object the construction of a machine which will grind continuously, at the same time raising the valve grinding means from the valve after a given number of revolutions, or intermittently, with either long or short intervals, at the will of the operator.

The invention consists in the construction, arrangement and combination of parts, as will be hereinafter more fully described and pointed out in the claims.

I have illustrated my invention in the accompanying drawing in which—

Figure 1 is a view of the invention in side elevation. Fig. 2 is an enlarged detail view of means for increasing the pressure on the screw driver spindles. Fig. 3 is a cross-section on line $X^4—Y^4$, Fig. 1. Fig. 4 is a detail view showing in end elevation the cam, sprocket wheels, cam roller, crank shafts and a portion of push rods and links.

Referring to the illustration, 8 is the foundation casting supporting the machine, the pillars, 4, 4' and 5 being integral therewith. The square central frame 13 is supported on the pillars 4 and 5. The columns P' and P are secured respectively to the frame 13 and the pillar 5. A double crank-shaft Z, Z' and $Z^2$, is pivotally supported in the bearing Y on the pillar 5 and in the pillar 4'. A pulley 3 is keyed to the outer end of the shaft Z and is adapted to be operated by a belt from the line shaft or other source of power. The clutch 2 is to throw the pulley in and out of engagement in the usual manner and is moved by the lever L, pivoted to the foundation casting and connected with the clutch by a bracket 1. Pivoted to the crank-shafts Z and Z' respectively are the links U and U' which are respectively connected to the links $F^2$ and $F^3$ by the turnbuckles S and S' which are used to give the right length to the links and tension to the chains, hereafter described. To the links $F^2$ and $F^3$ are respectively connected the block chains F and F'. The chain F passes over the vertical pulley D and the chain F' over the similar pulley D', both of which are pivoted to the frame 13 near the top. At the side of the machine the chains are turned on edge and become integral and pass around the horizontal drive sprocket wheel 11 which is secured to the upper end of a drive shaft 12, the upper and lower ends of which are pivoted in arms extending from the frame. A drive pulley N is secured to the shaft 12 near its lower end. Extending from the central part of the frame are arms 14 to which are pivoted the pulleys $N^2$ through which pass the screw driver spindles K, the spindles being secured by keys $n$, in the pulleys and driven by them, but permitted a vertical movement in the pulleys. On three sides of the frame 13 are pivoted the idler pulleys $N^5$, the drive belt M passing inside the drive pulley N, inside the idler pulleys and outside the pulleys $N^2$. The belt is driven by the pulley N and drives each of the pulleys $N^2$, the idler pulleys giving it the needed tension.

To the lower end of the spindles K are secured the sockets O in which are removably secured the screw drivers Q, the sockets being adapted for the adjustment of a variety of similar tools. The tables R are secured to the columns P and P', one table being provided for each screw driver, and being movably held by the bolts 6 are adapted to be moved up and down or turned horizontally for the proper adjustments. The spindles turn in the bearings J and J' extending out from the central frame. To the upper ends of the spindles are secured links H connecting them with the sleeves G, Fig. 2, the links being freely held in the sleeves by the heads $a$ on the links, and permitting a rotary motion in the sleeves. In the opposite ends of the sleeves are adjustably secured the driving links $E^{10}$ by means of the screws $E^9$. The upper ends of the links $E^{10}$ are movably secured to the arms C which are pivotally secured to the walking beam B, pivoted at the center at the point A of the frame 13.

The means of operating the walking beam and giving the screw drivers the vertical movement are shown more clearly in Fig. 4. Secured to the crank shaft $Z^2$ is a sprocket wheel X', and in the bearing Y is secured a cap screw $W^2$ furnishing an axle for the sprocket wheel X, the two sprocket wheels being connected by a chain $X^2$. On the outside of the sprocket wheel is secured a cam W. Pivoted to the axis W² is an arm V' having a longitudinal slot W', the arm bending at right angles above the cam wheel where the push rod T is secured to it by the nuts t. The push rod is pivoted to the walking beam at one end, as seen in Fig. 1. A cam roller V is pivoted to the side of the arm V', and as the cam and sprocket wheel X are turned by the chain, the roller is hit by the cam and the arm and push rod raised. The movement causes the walking beam to oscillate and raise the screw drivers.

We have already seen how the screw drivers are turned by the crank-shafts, links and chains, and the sprocket wheel, drive shaft, pulleys and belt, the operation of the links and chains causing the sprocket wheel N to constantly reverse its motion. The mechanism is so adjusted that the screw drivers are alternately turned one and one-half times in each direction. It will be seen that the sprocket wheel X', being on the same shaft with the links U and U', the walking beam will oscillate and the screw drivers be raised at a given ratio with the turning of the screw drivers. In practice the mechanism is so gaged that the cam wheel W revolves once while the crank shafts Z, Z', revolve five times. Thus are the screw drivers lifted from operation of the valves on the tables R and opportunity given for the application of oil, ground glass or other substance necessary for grinding. After the adjustment of the tables the valves are placed in position thereon and held in a lap or suitable holder and the grinding means operated by the screw drivers.

As the length of time required to grind the valves depends upon the temperature, the grinding compound and other conditions, it is necessary that provision be made for regulating the time of grinding of each screw driver separately. This is done by the adjustment of the links E¹⁰ in the sleeves G by means of the screw E⁹, the length of the interval between the raising of each screw driver depending on the length of the link E¹⁰. If desired any one or all the screw drivers may be entirely released from the vertical movement at the will of the operator by merely loosening the screw E⁹ and permitting the link to move idly.

In Fig. 2 is shown the means for imparting a downward pressure on the spindles K. The links H pass freely through the horizontal, curved ends of arms I, the opposite ends being pivoted to bolts 7 secured in the frame. To the central part of the arms are secured vertical rods E⁵ through the upper ends of which freely pass the threaded rods E⁸, to the ends of which are adjusted thumb nuts E² to regulate the tension of the springs E. To the opposite ends of the rods E⁸ are secured the springs E, the opposite ends of the springs being secured to the driving links E¹⁰. The pressure of the spring and rod will be felt upon the arm I as the link rises, and the arm pressing upon the end of the spindle K, tends to hold the screw driver in engagement and prevent it being raised too quickly. Each one may be regulated separately, the tension of the spring being adjusted by the thumb nuts E².

The object of having the screw drivers reverse the motion, is to secure greater effectiveness and less noise in operation, the method shown being practically noiseless so far as relates to the operation of the machine, while the character of the work done is superior.

In machines having a sudden reversal of motion it is necessary that the parts concerned in the reversal be made light in weight. I therefore prefer to construct the pulleys N, N² and N⁵, shown in Fig. 3, of aluminum, or similar material which gives a maximum of strength and lightness. Said material also furnishes better contact for the operating belt, but I do not limit myself to any particular kind of material in any part of the machine, but am free to use the best material for the purpose required.

The arrangement of the spindles around a central column insures compactness and saving of space and an indefinite number may be arranged in similar manner.

Having described my invention what I claim as new and desire to secure by Letters Patent, is,—

1. In a valve seating machine, the combination with a supporting frame, a driven wheel pivoted therein, operating tools pivoted in the frame, wheels for the operation of said tools, chains for the operation of said wheels, means oppositely connecting said chains with the driven wheel whereby the operating tools are alternately turned in opposite directions, of an oscillating beam pivoted to said frame, means connecting the beam with the operating tools for raising and lowering the tools, a cam operated by said driven wheel and means connecting the cam with the oscillating beam for giving it the oscillating motion, substantially as described.

2. In a valve seating machine, the combination with a supporting frame and a driven wheel pivoted therein, of operating tools pivoted in said frame, wheels for the operation of said tools, chains for the operation of said wheels, means oppositely connecting said chains with the driven wheel whereby the operating tools are alternately turned in opposite directions, an oscillating beam pivoted to the frame, means connecting the beam with the operating tools for raising and lowering the tools, a cam wheel operated by said driven wheel and a rod operated by the cam wheel and connected to the oscillating beam for giving the beam the oscillating motion, substantially as described.

3. In a valve seating machine, the combination with a supporting frame, a driven pulley pivoted therein, a shaft with oppositely disposed crank-arms thereon operated by the pulley, tools for seating the valves, means connecting the tools with the crank-arms whereby the tools are alternately turned in opposite directions, of an oscillating beam pivoted to the frame, means connecting the beam with the tools for raising and lowering the tools, a cam wheel operated by the driven pulley and a push rod operated by the cam wheel and pivoted to the oscillating beam for giving the beam the oscillating motion, substantially as described.

4. A valve seating machine consisting of a supporting frame, a shaft having oppositely disposed crank arms thereon pivoted in the frame, a driven pulley for the operation of said shaft, links pivoted to the crank arms, chains secured to said links, pulleys on which the chains operate pivoted to the frame, a sprocket wheel operated by the chains, a shaft driven by the sprocket wheel, pulleys operated by the shaft, screw drivers rotated by the pulleys for seating the valves, a cam wheel driven by said crank shaft, a walking beam pivoted to the frame, a push rod operated by the cam wheel and pivoted to the walking beam for oscillating the walking beam, spindles pivoted to the walking beam and connected to the screw drivers for giving the screw drivers a vertical movement, means for adjusting the length of the spindles and for releasing them from operation of the screw drivers, whereby the screw drivers are alternately turned in opposite directions and intermittently raised from the valves, and tables for the support of the valves, substantially as specified.

5. A valve seating machine consisting of a supporting frame, a shaft having oppositely disposed crank arms pivoted in the frame, a driven pulley for the operation of the shaft, links pivoted to the crank arms and driven thereby, chains secured to said links, pulleys pivoted to the frame on which the chains operate, a sprocket wheel driven by the chains, a shaft driven by the sprocket wheel, a drive pulley secured to said shaft, a belt operated by said pulley, pulleys pivoted to the frame and driven by said belt, screw drivers connected to and rotated by said pulleys for seating the valves a cam wheel driven by the crank shaft, a walking beam pivoted to the frame, a push rod operated by the cam wheel and pivoted to the walking beam to oscillate the walking beam, spindles pivotally connected to the walking beam and to the screw drivers to give the screw drivers a vertical movement, means for releasing the spindles from operating the screw drivers and means for adjusting the length of the spindles, whereby the screw drivers are alternately turned in opposite directions and intermittently released from operation, and tables for the support of the valves, substantially as specified.

6. A valve seating machine consisting of a supporting frame, a driven pulley pivoted therein, a double crank shaft operated by the pulley, pulleys pivoted to the frame, chains for the operation of said pulleys, links secured to the chains and pivotally secured to the crank shaft, screw drivers connected to and driven by the pulleys for seating the valves, a sprocket wheel driven by the crank shaft, a cam wheel driven by the sprocket wheel, a push rod pivoted to the cam wheel and raised and lowered thereby, a walking beam pivoted to the frame and oscillated by said push rod, spindles pivotally connected to the walking beam and secured to the screw drivers to give the screw drivers a vertical movement, means for releasing the spindles from the operation of the screw drivers and for adjusting the length of the stroke of the same, and tables adjustable to the frame for the support of the valves, substantially as specified.

In testimony whereof I have hereunto signed my name in the presence of two subscribing witnesses.

OSCAR A. OLSON.

Witnesses:
JOHN G. BURKET,
JOE ROBERTS.

---

Copies of this patent may be obtained for five cents each, by addressing the "Commissioner of Patents, Washington, D. C."